Dec. 1, 1936.  H. CHRISTENSEN  2,062,968
GEAR BOX, ESPECIALLY FOR AUTOMOBILES
Filed Nov. 7, 1933   3 Sheets-Sheet 1

Inventor:
H. Christensen
By: Glascock Downing Daboll
Attys.

Dec. 1, 1936.  H. CHRISTENSEN  2,062,968
GEAR BOX, ESPECIALLY FOR AUTOMOBILES
Filed Nov. 7, 1933  3 Sheets-Sheet 2

Inventor:
H. Christensen
By: Glascock Downing Seebold
Attys.

Dec. 1, 1936.  H. CHRISTENSEN  2,062,968
GEAR BOX, ESPECIALLY FOR AUTOMOBILES
Filed Nov. 7, 1933  3 Sheets-Sheet 3

Inventor:
H. Christensen
By: Glascock Downing
& Seebold
Attys.

Patented Dec. 1, 1936

2,062,968

UNITED STATES PATENT OFFICE 2,062,968

GEAR BOX, ESPECIALLY FOR AUTOMOBILES

Heinrich Christensen, Copenhagen, Denmark

Application November 7, 1933, Serial No. 697,047
In Germany November 8, 1932

4 Claims. (Cl. 74—375)

The present invention relates to change speed mechanism for gear boxes having a number of axially movable slides for changing the gears. The change mechanism according to the invention is specially applicable to semi-automatic change speed mechanisms by which it secures a reliable changing of the gears by means of a special cooperation between the separate slides.

Figure 1:
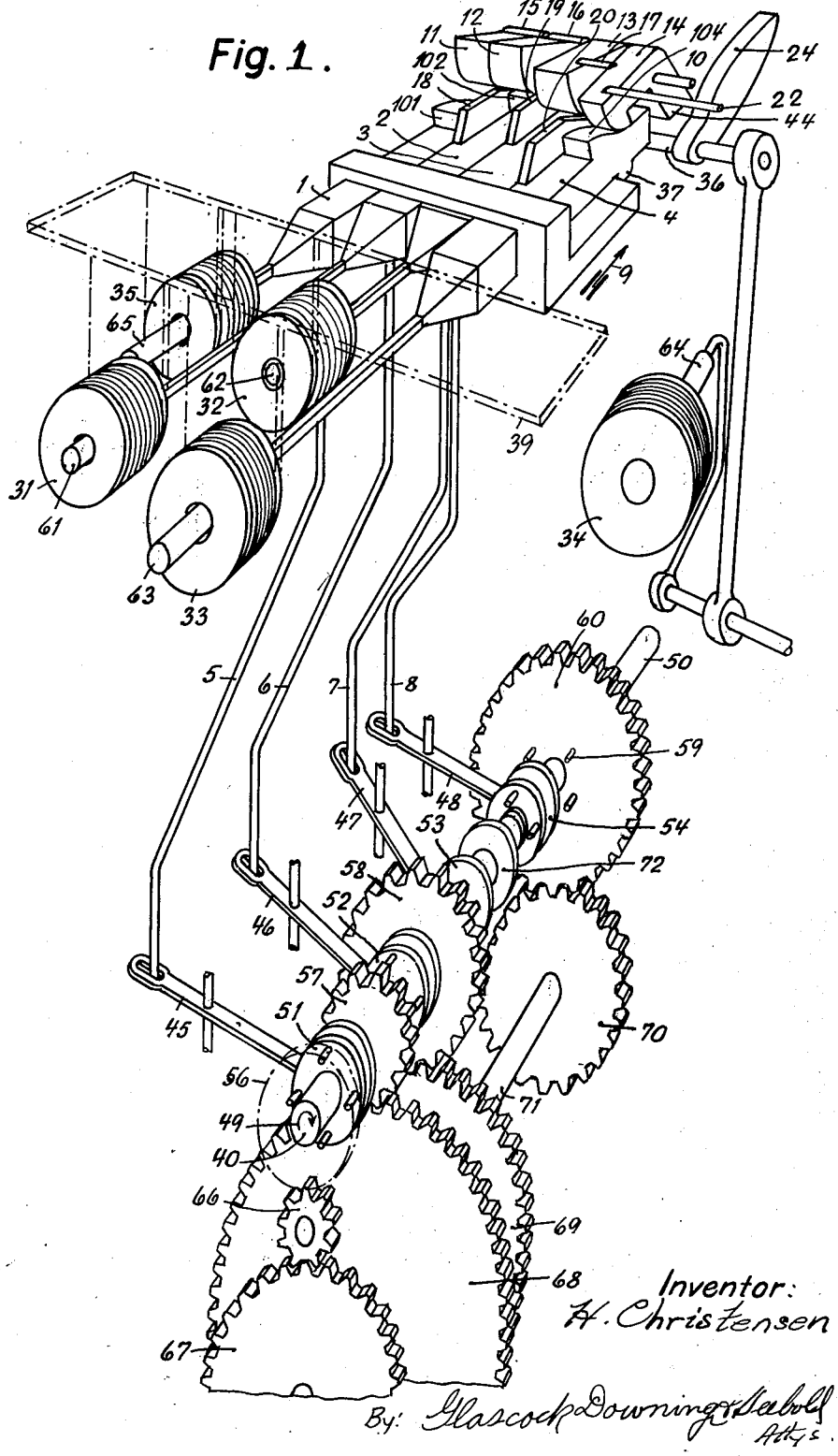
Figure 2:
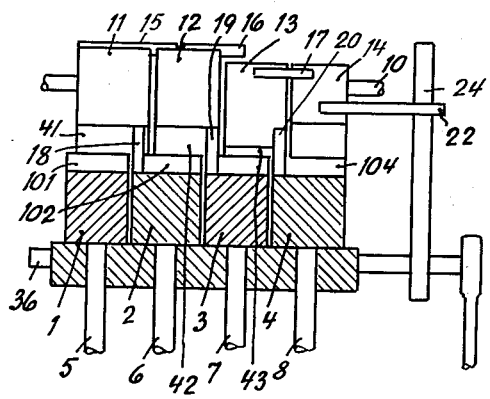
Figure 11:
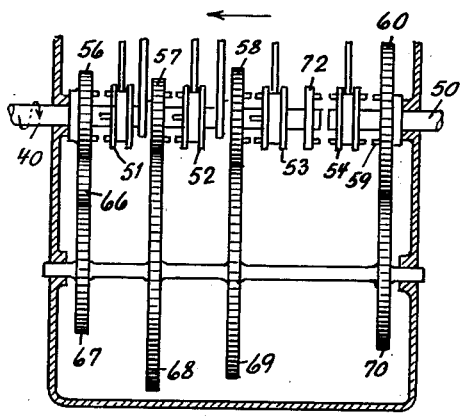
Figure 3:
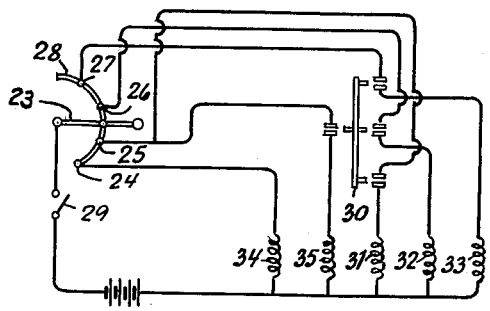
Figure 4:
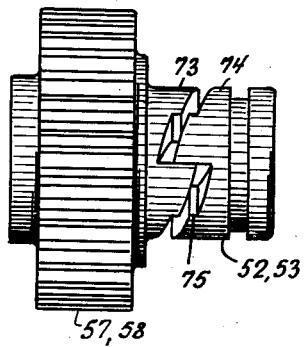
Figure 5:
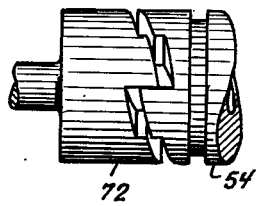
Figure 6:
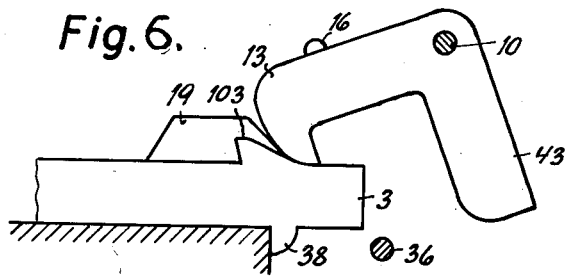
Figure 7:
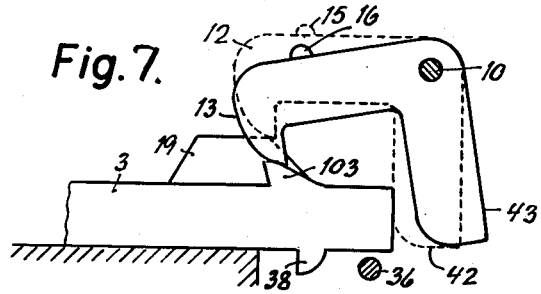
Figure 8:
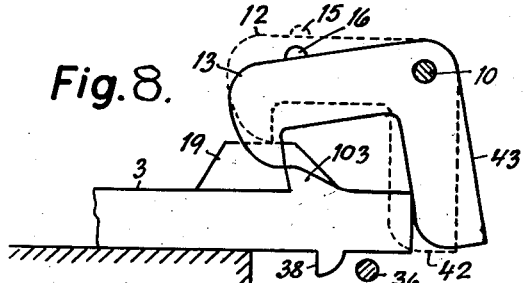
Figure 9:
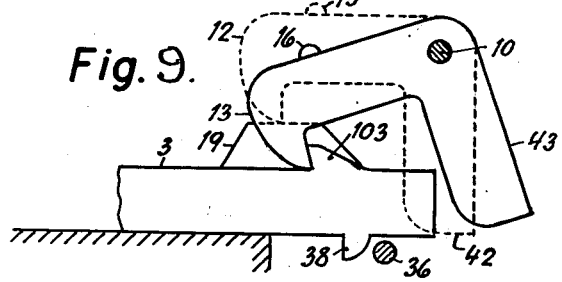

For attaining this cooperation the slides according to the invention have hooks which can be successively caused to engage corresponding turnable hooks known per se, some of which are provided with a lug engaging the adjacent hook, as will be explained in the following specification in relation to the accompanying drawings in which:

Fig. 1 shows in perspective the change mechanism applied to a gear box of usual construction, Fig. 2 is a cross section through the slides in said change mechanism, Fig. 3 shows diagrammatically, an accessory electric arrangement, Fig. 4 is a perspective view, showing a construction of the couplings shown in Fig. 1 and serving to set the 1st and 2nd gear into operation, Fig. 5 is a perspective view, showing a construction of the coupling shown in Fig. 1 and serving to couple the 3rd gear, which in the example shown is the highest gear, Figs. 6–10 are side views of a slide with its corresponding hook and adjacent hook cooperating with the cam of the slide in a number of different positions, Figure 11 is a sectional view through the gear box.

The numerals 1 to 4 indicate four longitudinally movable slides, which by means of downwardly extending arms 5—8 serve the purpose of shifting the gears into or out of operation, when the slides are moved from the initial forward position in the direction of the arrow 9.

Each slide has at the end a hook 101—104, which can be caused to engage a corresponding hook 11—14 pivotally mounted on the shaft 10.

Each of the hooks 11, 12, and 13 is fitted with a lug 15, 16, 17 overlying the adjacent hook to the right (Fig. 1). Thereby any of the hooks when lifted will at the same time lift the hooks situated to the left of the same. The slides 2, 3, and 4 are provided with cams 18, 19, and 20, which engage and lift the turnable hook, which is situated immediately to the left of the same, with which the hook of the slide concerned is cooperating.

Each of the turnable hooks 11, 12, 13, and 14 is fitted with a downwardly extending arm 41—44, by means of which the corresponding slide 1—4, when the turnable hook 101—104 is lifted, is moved some suitable distance in a direction opposite to the arrow 9. The length of this distance will be mentioned in the following.

A cross bar 36 fitted with a cam 24 cooperates with a guide pin 22 on the hook 14, in order to lift the same, and thereby the other turnable hooks by means of the lugs 15, 16, and 17 when said cross bar 36 is moved in a direction opposite to that of the arrow 9. During this movement, cross bar also cooperates with downwardly extending lugs on the slides 1—4 and carries these back to their original position, unless the said slides are already in the said position.

On the drawings the said downwardly extending lug of the slide 4 is designated 37, and the lug of the slide 3 is designated 38, the lugs of the other slides not being shown on the drawings.

To the ends of the slides 1—4 are attached armatures 65, 61, 62, and 63 belonging, respectively, to the solenoids 35, 31, 32, and 33 fixed to the machine frame 39 shown with dotted and dashed lines in Fig. 1, and by energizing one of the said solenoids 35 and 31—33, the corresponding slide 1—4 will be moved in the direction of the arrow 9. The bar 36 is connected with the armature 64 of a solenoid 34 which, when energized, will cause a movement of the bar 36 in the direction opposite said arrow.

Each arm 5—8 connects with a lever 45—48, said levers being turned by the arms and thereby bringing into and out of action a corresponding number of couplings in the gear box concerned.

In the gear box, (not shown) the driving shaft 40 is arranged, which runs in the direction of the arrow 49, and 50 is the driven shaft. The shaft 40 supports a series of couplings with parts 51, 52, and 53 adapted to be moved axially in keyways by the corresponding levers 45—47, and in similar manner a coupling part 54 can be moved on the shaft 50, by the lever 48. The coupling parts 51—53 can be caused to engage other coupling parts on the rear side of freely rotatable gear wheels 56 and 57 and the somewhat larger toothed wheel 58. The wheel 56 is shown in Fig. 1 in dotted lines. The coupling part 54 actuated by the slide 4 may be caused to engage either a coupling part 72, firmly connected to the shaft 40 or a coupling part 59, which is disposed on a gear wheel 60 free to rotate on the shaft 50. The gear wheel 56 for reverse driving transmits, by way of an intermediate wheel 66 its motion to the gear wheel 67, which is fixed to an intermediate shaft 71. The latter supports further the gear wheels 68, 69, and 70, which are in engagement with the wheels 57, 58, and 60, respectively. When the slide 4 is in its initial position the coupling 54, 72 is disengaged and the coupling 54, 59 closed.

The couplings 52, 57 and 53, 58 may be constructed as shown in Fig. 4, and the coupling 54, 72 as shown in Fig. 5.

A lever 23, Fig. 3 for regulating the supply of gas to the motor is adapted to be pressed down against a quadrant 28 and, by means of a contact rail not shown, the said lever can be caused to slide along the quadrant, which consists of insulating material with contact pieces 24, 25, 26, and 27 inserted therein. Hereby electrical circuits are closed successively across a main switch 29, contact rail and contact piece, and the solenoids 31, 32, 33, and 34. By means of a switch 30 the circuits can be broken across the solenoids 31, 32, and 33 and instead, the current may be closed through the solenoid 35.

The power-transmitting device operates in the following manner:

Assuming the slides 1 to 4 are in their initial forward position with the couplings 51—56 and 52—57 and 53—58 open and the coupling 54—59 closed and the driver has started the motor, and closed the switches 29 and 30, Fig. 3, the latter one connected with the solenoids 31, 32, and 33, he then moves the gas lever 23, which is held depressed against the quadrant 28, from the contact piece 24 to the piece 25. At the same time as the number of revolutions of the motor is increased owing to the increased supply of gas, the solenoid 31 is now actuated, the slide 2, Fig. 1 is moved in the direction of the arrow 9 and closes the coupling 52, 57 by means of its arm 6 and lever 46. As further the coupling 54, 59 is initially closed when the slide 4 is in its forward position, the transmission of power will pass from the driving shaft 40 to the driven shaft 50 through the coupling 52, 57, Fig. 1, the gear-wheel transmission 57, 68 the shaft 71, the gear wheel transmission 70, 60 and the coupling 54, 59, when the main coupling or clutch of the motor, which is not shown on the drawings, is closed. The coupling part 52 is firmly locked in its position of engagement on account of the hook 102 of the slide 2 being in engagement with the corresponding turnable hook 12.

When a suitable speed in the 1st speed gear is attained, the gas lever 23, Fig. 3 is turned up to the contact piece 26, and the transmission gear is shifted to second speed automatically, at the same time as the 1st speed gear is set out of operation in the following manner.

By closure of the circuit across the contact piece 26, Fig. 3, the solenoid 32 is actuated, and the slide 3, Fig. 1 is pushed rearwardly in the direction of the arrow 9. Some situations during this movement are shown in Figs. 6–9. The cam 19 of the said slide 3 lifts the hook 12, and the downwardly extending arm 42 of this hook pushes the initially operated slide 2 a distance forwardly, the hook 102, of slide 2 being thereby disengaged from the hook 12. The length of the return motion of the slide 2 corresponds exactly to the coupling part 52 being withdrawn through a distance corresponding to the length of the edge 75 of the coupling part 52 in Fig. 4. This part 52 continues consequently to engage the coupling part on the wheel 57, but as the latter begins to run faster than the part 52, the latter will be pushed away by the cam surfaces 73, 74, and the coupling will be released entirely. This condition will exist when at the next moment the hook 103 of the slide 3, Fig. 1, engages with the hook 13, and the coupling 53, 58, Fig. 1 is closed, and the transmission of power is now effected by the shaft 40 by way of this coupling 53, 58, the gear wheels 58, 69, the shaft 71, the gear wheels 70 and 60 and the coupling 54, 59 to the driven shaft 50. In consequence of the altered ratio of gearing between the shafts 40 and 50, the latter will now have a relatively higher rotary speed, and the same applies to the gear wheel 57.

The change from 2nd to 3rd gear is performed in the following manner.

When the contact rail of the gas lever 23, Fig. 3 closes contact with the contact piece 27, the solenoid 33 is actuated, the slide 4, Fig. 1 in moving rearwardly is caused to cooperate with the hook 14, and the latter raises the hook 13 moves the slide 3 to initial forward position, and the coupling 54, 72, Fig. 1 is closed, while the couplings 53, 58 and 54, 59 are opened. The power is now transmitted directly from the driven shaft 40 by way of the closed coupling 54, 72 to the closed shaft 50, and all the intermediate wheels disposed on the shaft 71 and those in engagement with the wheels of the latter are now inoperative. The speed of the vehicle can now be varied by regulation of the supply of gas, as the gas lever 23, Fig. 3 being disengaged from the quadrant 28 will not effect any further gear shifting movements.

Figure 10:
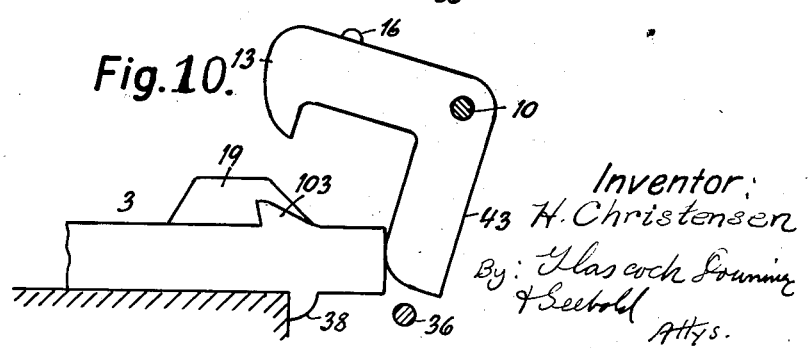

If it be desired to change to some other gear, the contact rail of the arm 23 is pressed against the contact piece 24, and thereby the solenoid 34, Fig. 2 is actuated, and the cam 24 lifts the hook 14 in the manner mentioned before and the cross bar 36 returns to the initial position all slides that might not already have been fully returned as shown in Fig. 10. The coupling 54, 72, Fig. 1 is disengaged, and the coupling 54, 59 is restored to closed condition, and thereby the transmission gear is in neutral. Then any one of the gears can be brought into operation as mentioned above.

If it be desired to put the transmission in reverse gear, the switch 30 Fig. 3 is caused to close the circuit across the solenoid 35, and the latter is then actuated by pressing the contact rail of the gas lever 23 against the contact piece 25. By the actuation of the solenoid 35 the hook of the slide 1, Fig. 1 is caused to engage the hook 11, and the coupling 51, 56, Fig. 1 is closed. Thereby the power is transmitted from the shaft 40 through the coupling 51, 56, the gear wheels 56, 66, and 67, the shaft 71, the gear wheels 70 and 60, the coupling 54, 59 to the shaft 50 the latter revolving in the opposite direction.

Having now described my invention what I claim as new and desire to secure by Letters Patent is:

1. In a gear change speed mechanism for gear boxes, a plurality of axially movable slides having an initial position and adapted, when moved to control the changing of the separate gears of the gear box, a plurality of pivoted hooks, members on said slides engageable with said hooks, lugs carried by said hooks and certain of said lugs overlying certain of the said hooks whereby when one of the said hooks is lifted all hooks to one side thereof are simultaneously lifted.

2. An arrangement as claimed in claim 1 characterized by the provision of cams on certain of said slides, each cam being adapted to engage and raise the hook associated with the adjacent slide.

3. An arrangement as claimed in claim 1 characterized by the provision of a bar engageable with the slides to move the latter to initial position, and means on said bar co-acting with another of said lugs to raise the latter and the hook associated therewith, the remaining hooks being raised by the lugs carried thereby.

4. An arrangement as claimed in claim 1 characterized by the provision of cams on certain of said slides, each cam being adapted to engage and raise the hook associated with the adjacent slide, a bar engageable with the slides to move the latter to initial position, and means on said bar coacting with another of said lugs to raise the latter and the hook associated therewith, the remaining hooks being raised by the lugs carried thereby.

HEINRICH CHRISTENSEN.